(12) United States Patent
Chin et al.

(10) Patent No.: US 9,383,229 B2
(45) Date of Patent: Jul. 5, 2016

(54) OPTICAL REFLECTIVE ENCODER WITH MULTI-FACETED FLAT-FACED LENS

(75) Inventors: Yee Loong Chin, Lahat Perak (MY); Wee Jin Yeap, Penang (MY)

(73) Assignee: Avego Technologies General IP (Singapore) Pte. Ltd., Singapore (SG)

( * ) Notice: Subject to any disclaimer, the term of this patent is extended or adjusted under 35 U.S.C. 154(b) by 850 days.

(21) Appl. No.: 12/916,582

(22) Filed: Oct. 31, 2010

(65) Prior Publication Data

US 2012/0104242 A1    May 3, 2012

(51) Int. Cl.
  *G01J 9/00* (2006.01)
  *G01D 5/36* (2006.01)
  *G06M 7/00* (2006.01)
  *G01D 5/347* (2006.01)

(52) U.S. Cl.
  CPC ....... *G01D 5/34715* (2013.01); *Y10T 29/49002* (2015.01)

(58) Field of Classification Search
  CPC ............ G01D 5/34715; G01D 5/3473; G01D 5/34707; G01D 5/34746; G01D 5/34738; G01D 5/347; G01D 5/34723; G01D 5/34753; G01D 5/34776; G01D 5/34784; G01D 5/34792; G01D 5/38; B62D 15/021; B62D 15/0215

USPC ............... 250/231.13–231.18, 216, 239, 221, 250/237 G; 356/614–619; 359/436, 438, 359/440–442; 341/13, 14; 33/1 R, 1 L, 1 N, 33/1 SP, 1 PT
  See application file for complete search history.

(56) References Cited

U.S. PATENT DOCUMENTS

| | | | |
|---|---|---|---|
| 5,283,434 A * | 2/1994 | Ishizuka et al. | 250/237 G |
| 5,537,210 A | 7/1996 | Kaneda et al. | |
| 5,661,303 A | 8/1997 | Teder | |
| 6,104,023 A * | 8/2000 | Maeda | 250/231.13 |
| 6,683,295 B2 | 1/2004 | Cruz-Cabrera et al. | 250/216 |
| 7,034,282 B2 | 4/2006 | Oka et al. | |
| 7,182,258 B2 * | 2/2007 | Foo et al. | 235/454 |
| 7,309,855 B2 | 12/2007 | Nagasaka et al. | |
| 7,473,886 B2 | 1/2009 | Benner | |
| 7,495,583 B2 | 2/2009 | Tan et al. | |
| 7,507,950 B2 * | 3/2009 | Wong et al. | 250/231.13 |
| 8,324,602 B2 * | 12/2012 | Wiese et al. | 250/551 |
| 2006/0016970 A1 * | 1/2006 | Nagasaka et al. | 250/231.13 |
| 2007/0241271 A1 * | 10/2007 | Chin et al. | 250/231.13 |
| 2007/0241943 A1 * | 10/2007 | Tan et al. | 341/50 |
| 2007/0246645 A1 * | 10/2007 | Wong et al. | 250/231.13 |

* cited by examiner

*Primary Examiner* — Pascal M Bui Pho

(57) ABSTRACT

Disclosed are various embodiments of high-speed, high-performance, low-noise, low-cost, compact, optical encoders having a multi-faceted flat-faced lens is disposed over the light emitters and light detectors thereof. Disclosed also are various means for preventing undesired stray light from reaching light detectors incorporated therein. Structures employed to block stray light in the optical encoders include light barriers, air gap trenches, and coatings disposed between first and second sides of a substrate of the encoder. Methods of making such optical encoders are also disclosed.

20 Claims, 14 Drawing Sheets

OPTICAL REFLECTIVE ENCODER WITH MULTI-FACETED FLAT-FACED LENS

FIELD OF THE INVENTION

Various embodiments of the invention described herein relate to the field of optical encoders, and components, devices, systems and methods associated therewith.

BACKGROUND

Optical encoders are typically employed as motion detectors in applications such as closed-loop feedback control in a motor control system. Many optical encoders are configured to translate rotary motion or linear motion into a two-channel digital output for position encoding.

Many optical encoders employ an LED as a light source. In transmissive encoders, the light is collimated into a parallel beam by means of a lens located over the LED. Opposite the emitter is a light detector that typically consists of photodiode arrays and a signal processor. When a code scale such as a code wheel or code strip moves between the light emitter and light detector, the light beam is interrupted by a pattern of bars and spaces disposed on the code scale. Similarly, in reflective or imaging encoders, the lens over an LED focuses light onto the code scale. Light is either reflected or not reflected back to the lens disposed over the photo-detector. As the code scale moves, an alternating pattern of light and dark patterns corresponding to the bars and spaces falls upon the photodiodes. The photodiodes detect these patterns and corresponding outputs are processed by the signal processor to produce digital waveforms. Such encoder outputs are used to provide information about position, velocity and acceleration of a motor, by way of example.

Transmissive optical encoders typically generate code scale images having good contrast, and hence are capable of operating at high speeds with high resolution. The high contrast characteristic of most transmissive optical encoders also permits the outputs provided thereby to be easily interpolated to higher resolution. Transmissive optical encoders usually require that light emitters be placed opposite light detectors, and thus require a relatively high profile in respect of package design.

In reflective optical encoders, the light emitter and light detector often may be placed on the same substrate, and thus low profile designs, fewer materials and shorter assembly times may be realized. Reflective optical encoders typically suffer from low contrast, which in turn leads to low speeds and low resolution.

Imaging optical encoders feature many of the same advantages as reflective optical encoders, such as low profiles and cost, but also require diffusive code wheels. In addition, imaging optical encoders suffer from low diffusive reflectance and usually cannot operate at very high speeds.

Reflective optical encoders known in the art often suffer from several performance and application problems, such as stray light originating at the light emitter hitting the light detector directly, which can cause contrast degradation, low encoder performance, limit resolution, and high manufacturing costs. Known reflective optical encoders also typically comprise an encapsulated dome with an emitter-detector pair disposed therewithin, which often leads to poor light collimation and consequent limits on encoder performance and resolution. Known reflective encoders also typically feature limited encoding capability, such as a maximum of two channels of data encoding, or a single index channel.

SUMMARY

In some embodiments, there is provided a reflective optical encoder comprising a substrate having a top surface with opposing first and second sides, and a bottom surface disposed substantially along or parallel to a horizontal plane, a light emitter mounted on or attached to the first side and configured to emit light therefrom, the light emitter being configured to emit a substantial amount of light along a direction normal to the horizontal plane, a single track light detector mounted on or attached to the second side, the single track light detector comprising at least one data channel light detector and an index channel light detector, the data and index channels being arranged along a common axis, and a multi-faceted lens comprising an optically transparent material, the lens being formed over and in direct contact with the light emitter and the single track light detector such that no air gap is located between the light emitter and the lens, or between the light detector and the lens, the multi-faceted lens comprising first and second top flat faces, the first face being located over the light emitter and being non-parallel to and tilted with respect to the horizontal plane, the second face being parallel to the horizontal plane, wherein the multi-faceted lens is configured to direct and refract selectively light emitted by the light source in a direction normal to or within about 20 degrees of normal to the horizontal plane towards a code scale for reflection therefrom, the code scale comprising index and data strips and configured to travel along the common axis, the code scale being located operably in respect of the lens such that at least a portion of the light reflected from the code scale is directed towards the second face and refracted through portions of the lens for detection by the light detector.

In other embodiments, there is provided a reflective optical encoder comprising a substrate having a top surface with opposing first and second sides, and a bottom surface disposed substantially along or parallel to a horizontal plane, a light emitter mounted on or attached to the first side and configured to emit light therefrom, the light emitter being configured to emit a substantial amount of light along a direction normal to the horizontal plane, a single track light detector mounted on or attached to the second side, the single track light detector comprising at least one data channel light detector and an index channel light detector, the data and index channels being arranged along a common axis, and a multi-faceted lens comprising an optically transparent material, the lens being formed over and in direct contact with the light emitter and the single track light detector such that no air gap is located between the light emitter and the lens, or between the light detector and the lens, the multi-faceted lens comprising first and second top flat faces, the first face being located over the light emitter and being parallel to the horizontal plane, the second face being located over the light detector and being non-parallel to and tilted with respect to the horizontal plane, wherein the multi-faceted lens is configured to direct and refract selectively light emitted by the light source in a direction normal to or within about 20 degrees of normal to the horizontal plane towards a code scale for reflection therefrom, the code scale comprising index and data strips and configured to travel along the common axis, the code scale being located operably in respect of the lens such that at least a portion of the light reflected from the code scale is directed towards the second face and refracted through portions of the lens for detection by the light detector.

In other embodiments, there is provided a method of making a reflective optical encoder comprising providing a substrate having a top surface with opposing first and second sides, and a bottom surface disposed substantially along or parallel to a horizontal plane, mounting or attaching a light emitter on or to the first side, the light emitter being configured to emit light therefrom and to emit a substantial amount of light along a direction normal to the horizontal plane, mounting or attaching a single track light detector on or to the second side, the single track light detector comprising at least one data channel light detector and an index channel light detector, the data and index channels being arranged along a common axis, and forming a multi-faceted lens comprising an optically transparent material, the lens over and in direct contact with the light emitter and the single track light detector such that no air gap is located between the light emitter and the lens, or between the light detector and the lens, the multi-faceted lens comprising first and second top flat faces, the first face being located over the light emitter and being non-parallel to and tilted with respect to the horizontal plane, the second face being parallel to the horizontal plane, wherein the multi-faceted lens is configured to direct and refract selectively light emitted by the light source in a direction normal to or within about 20 degrees of normal to the horizontal plane towards a code scale for reflection therefrom, the code scale comprising index and data strips and configured to travel along the common axis, the code scale being located operably in respect of the lens such that at least a portion of the light reflected from the code scale is directed towards the second face and refracted through portions of the lens for detection by the light detector.

In yet another embodiment, there is provided a method of making a reflective optical encoder comprising providing a substrate having a top surface with opposing first and second sides, and a bottom surface disposed substantially along or parallel to a horizontal plane, mounting or attaching a light emitter on or to the first side, the light emitter being configured to emit light therefrom and to emit a substantial amount of light along a direction normal to the horizontal plane, mounting or attaching a single track light detector on or to the second side, the single track light detector comprising at least one data channel light detector and an index channel light detector, the data and index channels being arranged along a common axis, and forming a multi-faceted lens comprising an optically transparent material, the lens being disposed over and in direct contact with the light emitter and the single track light detector such that no air gap is located between the light emitter and the lens, or between the light detector and the lens, the multi-faceted lens comprising first and second top flat faces, one of the first face and the second face being located over the light emitter and being non-parallel to and tilted with respect to the horizontal plane, the remaining face being parallel to the horizontal plane, wherein the multi-faceted lens is configured to direct and refract selectively light emitted by the light source in a direction normal to or within about 20 degrees of normal to the horizontal plane towards a code scale for reflection therefrom, the code scale comprising index and data strips and configured to travel along the common axis, the code scale being located operably in respect of the lens such that at least a portion of the light reflected from the code scale is directed towards the second face and refracted through portions of the lens for detection by the light detector.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings, unless otherwise noted.

DETAILED DESCRIPTIONS OF SOME EMBODIMENTS

In various embodiments, various combinations of multi-faceted, flat-faced lenses, diffractive optical elements, light barriers and air gap trenches are provided in optical reflective encoder systems, devices and methods.

Figure 1:
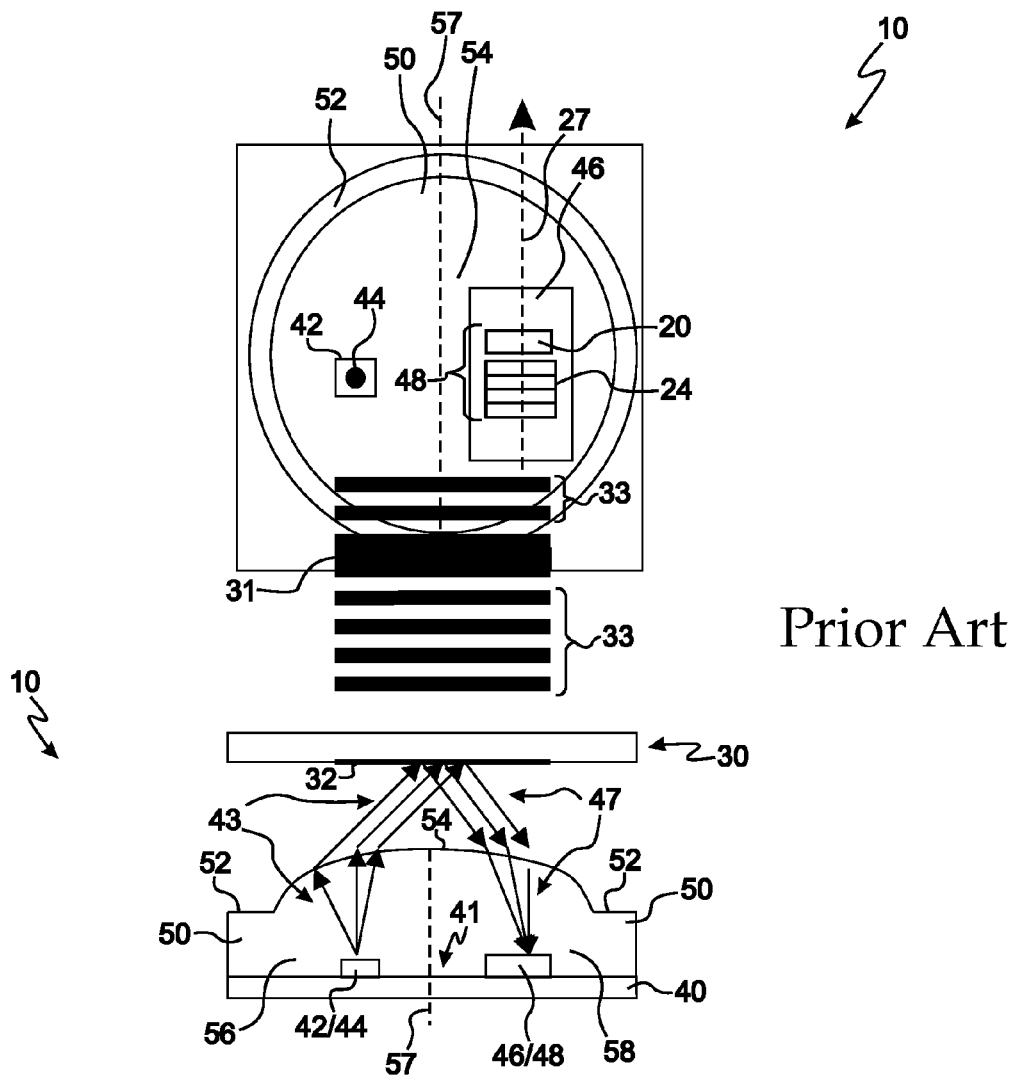
FIG. 1 shows top plan and cross-sectional views of a single dome lens optical encoder of the prior art.

FIG. 1 shows top plan and cross-sectional views of a prior art optical encoder 10. Substrate 40 has a top surface 41 with opposing first and second sides 56 and 58. Light emitter die 42 comprises light emitter 44 (which is configured to emit light therefrom), and is located on a first side 56 of substrate 40. Single track light detector 48 is mounted on or attached to a second side 58 of substrate 40, and comprises at least one data channel light detector 24 and an index channel light detector 20.

As employed herein, the term "single track encoder" means an optical encoder having a single code scale having data or code patterns or bars formed or presented thereon or therein, as well as index patterns or bars formed or presented thereon or therein, where the data and index patterns travel together along a common single axis in a single track disposed over a corresponding single track comprising data channel and index channel light detectors.

In FIG. 1, the first side 56 is opposite the second side 58 on the top surface 41 of substrate 40 such that light emitted from light emitter 42/44 travels primarily from the first side 56 upwardly towards code scale 30 for reflection therefrom downwardly towards second side 58 for detection by light detector 46/48. As shown in FIG. 1, single dome lens 50 comprises a curved outer lens surface 54 which is shaped and configured to direct light rays 43 and 47 away from light emitter 42/44 towards code and index scale 30 and thence back to light detector 46/48. Note that as employed herein, the term "code scale" or "code and index scale" can mean a code wheel, a code strip, a code and index wheel, or a code and index strip. Data channel light detector 24 and index channel light detector 20 are arranged along a common axis 27, which coincides with the direction of movement of code and index scale 30 disposed operably thereabove.

Continuing to refer to FIG. 1, single dome lens 50 comprises an optically transparent material, which in a preferred embodiment is a moldable epoxy. Single dome lens 50 is formed over and in direct contact with the light emitter 42/44 and single track light detector 48 such that no air gap is located between light emitter 42/44 and dome 50, or between the light detector 48 and the dome 50. The single dome lens 50 is configured to permit light 43 emitted from the light source to be refracted through portions thereof for reflection from a code and index scale 30 comprising index strips 31 and data strips 33, which is configured to travel along the common axis 27. The code and index scale 30 is located operably in respect of the single dome lens 50 such that at least a portion of the light 47 reflected from the code and index scale 30 is directed downwardly towards the single dome lens 50 and refracted through portions thereof for detection by the light detector 46/48. Note that the upper or outer surface 54 of single dome lens 50 may have a spherical, aspherical or biconic profile above one or both of the emitter 42/44 and the detector 46/48.

As further shown in FIG. 1, light detector 48 may comprise a single die 46 upon which the index channel and data channel light detectors are formed, or alternatively may comprise discrete dice for the index channel light detector and the data channel light detector, respectively. Reflective surfaces 32 formed on the underside of index strips 31 and data strips 33 are configured to permit upwardly projecting light rays 43 to be reflected therefrom to form downwardly projecting light rays 47.

Optional bevel or shoulder 52 may be formed around the outer periphery of single dome lens 50. Alternatively, the outer periphery of single dome lens 50 may be configured to project upwardly from the periphery above the uppermost portion of single dome lens 50 so as to form a protective protrusion to provide a protective ring or shoulder therearound.

Continuing to refer to FIG. 1, the data channel light detector 24 may comprise one light detector, at least two light detectors corresponding to A and A\ data channels, as is known in the art, at least four light detectors corresponding to A, B, A\ and B\ data channels, or any other number of light detectors suitable for the particular application at hand. In the embodiment shown in FIG. 1, four separate light detectors form data channel light detector 24By way of example, substrate 40 may be a printed circuit board, a lead frame, comprise plastic or be formed from a suitable polymer.

Figure 2:
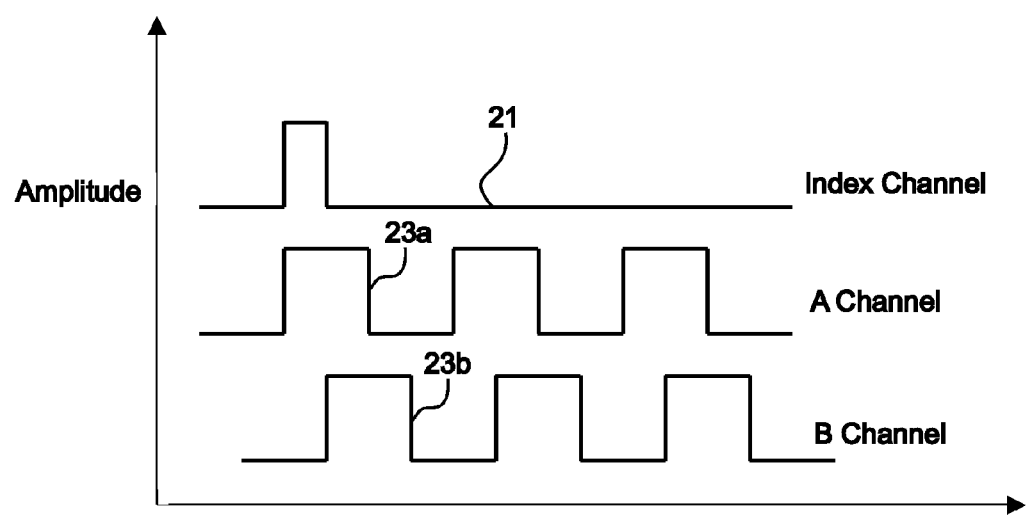
FIG. 2 shows illustrative output signals provided by the encoder of FIG. 1.

FIG. 2 shows illustrative output signals provided by the optical encoder shown in FIG. 1. As shown in FIG. 2, the index channel provides an output signal 21 which is preferably shorter in duration than the output pulses 23a and 23b provided by the A and B data channels.

Optical encoder 10 of FIG. 1 requires the use of lens 50 having a curved shape and outer profile, which can add considerable cost to encoder 10. During manufacturing of encoder 10, the curved shape and outer profile of lens 52 must be provided, typically by way of curing optically transparent material, which may be epoxy, in a precisely shaped and formed die.

Figure 3:
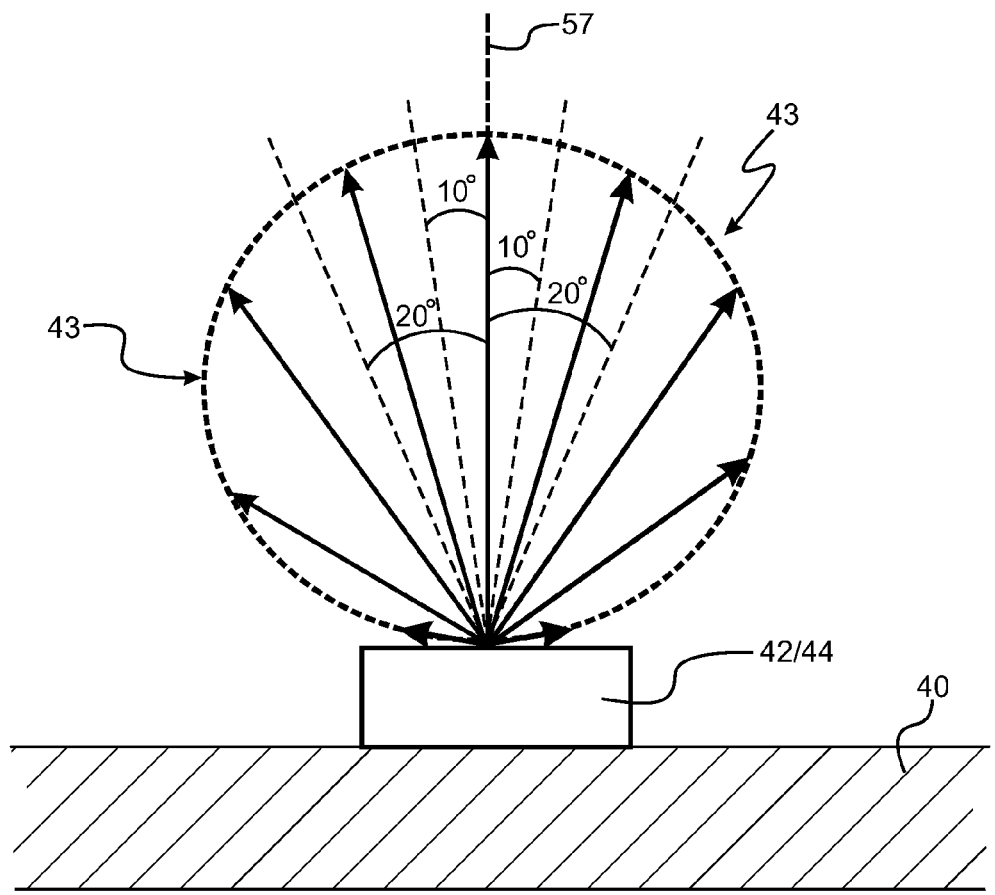
FIG. 3 shows a cross-sectional view of one embodiment of a Lambertian light source.

FIG. 3 shows light rays or beams 43 emitted by one embodiment of a light emitter 44 disposed in light emitter die 42, where light emitter 44 is a conventional Lambertian light source. Arrows 43 indicate the directions of the emitted light rays, while the lengths of arrows 43 indicate light ray intensity. It will be seen in FIG. 3 that light rays 43 travelling in an upward direction through lens 50 (but prior to refraction through the lens/air interface occurring at face 54) are closest to vertical (i.e., close to axis 57 normal to light die/light emitter 42/44, and within about 20 degrees or within about 10 degrees to the right or left of such normal in FIG. 3) carry a substantial and disproportionately large amount of light energy emitted by chip 42/44. For increased efficiency in power delivery, light rays falling within about 20 degrees from normal, or within about 10 degrees from normal, but prior to refraction through the lens/air interface occurring at face 54, may therefore become the primary focus of optical design. Light rays further away from normal than about 10 degrees, or about 20 degrees, and also prior to refraction through the lens/air interface occurring at face 54, carry less energy than light rays closer to normal 57, are less efficient for purposes of delivering power between emitter chip 42/44 and detector chip 44/48, and therefore may be treated as a secondary or tertiary focus of optical design.

Figure 4:
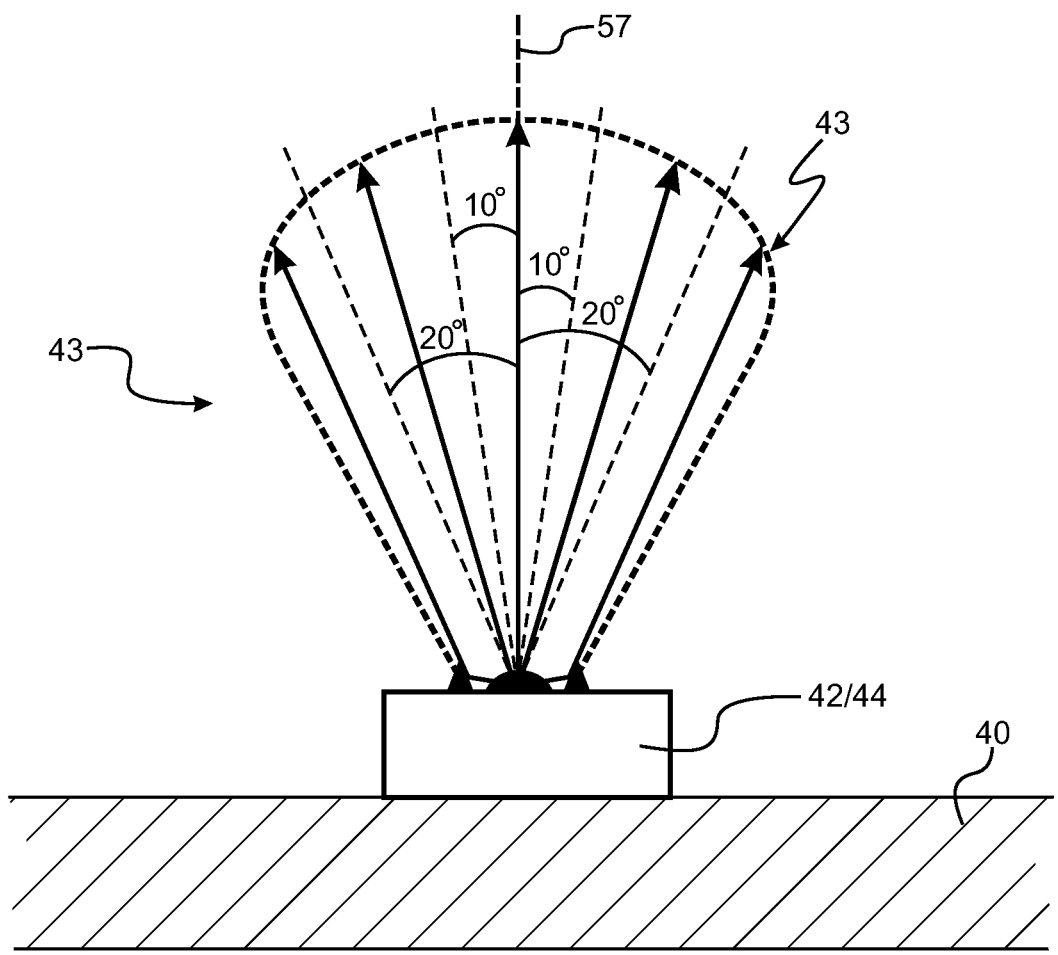
FIG. 4 shows a cross-sectional view of another embodiment of a Lambertian light source.

In addition, and as shown in FIG. 4, note that an increased amount of light can be focused in a vertical direction by placing or forming a light guiding, directing or collimating collar, ridge, lens, or appropriately formed aperture 77 with sidewalls near or around the light source of light emitter 42/44 to enhance and increase the strength of light focused in the vertical direction close to normal axis 57.

Figure 5:
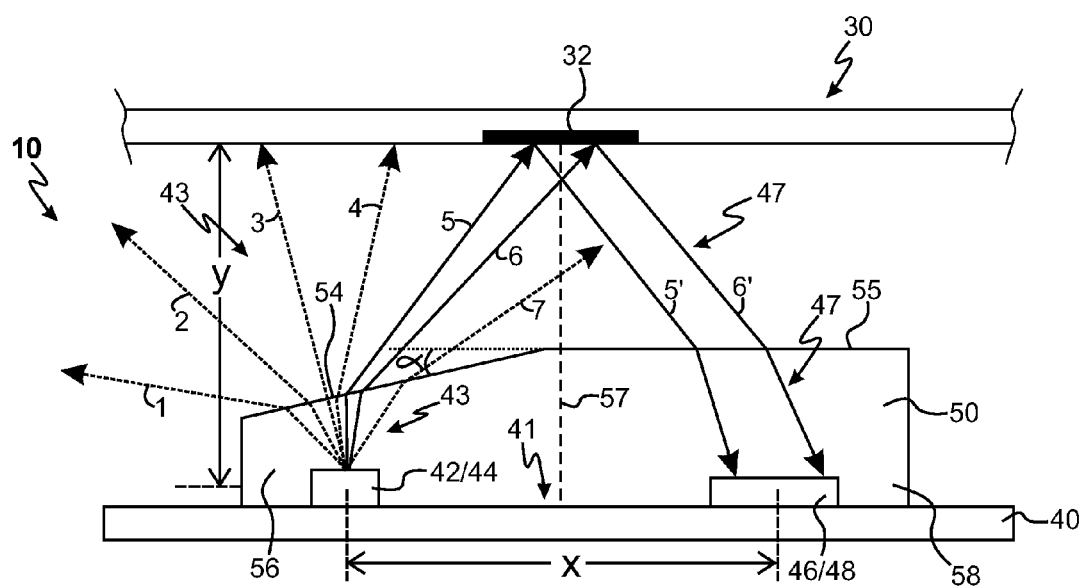
FIG. 5 shows a cross-sectional view of one embodiment of a multi-faceted flat-faced optical encoder.

FIG. 5 shows a cross-sectional view of one embodiment of a reflective optical encoder 10 comprising horizontal substrate 40 having top surface 41 with opposing first side 56 and second side 58. The bottom surface of substrate 40 is disposed substantially along or parallel to an imaginary horizontal plane. Light emitter 42/44 is mounted on or attached to first side 56 and is configured to emit light therefrom, and to emit a substantial amount of light along a direction normal to the horizontal plane. A single track light detector 46/48 is mounted on or attached to second side 58, and comprises at least one data channel light detector and an index channel light detector, where the data and index channels are arranged along a common axis. Multi-faceted lens 50 comprises an optically transparent material such as epoxy, where lens 50 is formed over and in direct contact with light emitter 42/44 and single track light detector 46/48 such that no air gap is located between light emitter 42/44 and lens 50, or between light detector 46/48 and lens 50. Multi-faceted lens 50 comprises first and second top flat faces 54 and 55, First face 54 is located over light emitter 42/44 and is non-parallel to and tilted with respect to the horizontal plane, while second face 55 is parallel to the horizontal plane. Multi-faceted lens 50 is configured to direct and refract selectively light emitted by the light source in a direction normal or within about 20 degrees of normal to the horizontal plane towards code scale 32 comprising index and data strips and configured to travel along the common axis for reflection therefrom. Code scale 32 is located operably in respect of lens 50 such that at least a portion of the light reflected from code scale 32 is directed towards second face 55 and refracted through portions of lens 50 for detection by light detector 46/48.

Continuing to refer to FIG. 5, note that light rays 5 and 6 of light rays 43 emerging from and refracted by lens 50 at the air/lens interface represented by first face 54 are selectively refracted and directed towards code scale 32 for reflection therefrom, light rays 5 and 6 being those light rays from among light rays 43 emitted by light emitter 42/44 that are closest to a normal projecting upwardly from light emitter 42/44, and carrying a disproportionately large amount of energy corresponding to the light emitted by light emitter 42/44. Contrariwise, light rays 1, 2, 3, 4 and 7 from among light rays 43, which rays project upwardly from light emitter 42/44 but at angles exceeding about 10 degrees or about 20 degrees from the aforementioned normal, carry lesser amounts of energy and may not be refracted towards code scale 32 for reflection therefrom.

Various geometric factors can be optimized to produce such a desirable result, such as optimizing the angle alpha at which first face 54 is oriented with respect to the horizontal and second face 55, the horizontal distance X between the center of light emitter 42/44 and the center of light detector 46/48, and the vertical distance Y between the light source of light emitter 42/44 and code scale 32. Those skilled in the art will now appreciate readily the manner in which such factors can be coordinated and manipulated to optimize the amount of light emitted by fight emitter 42/44 that is directed towards code scale 32 for reflection therefrom. For example, and as shown in FIG. 4, the tilted surface of face 54 located above light emitter 42/44 is configured to deflect the primary rays of the Lambertian light source towards code scale 32 for reflection therefrom towards detector 46/48. By optimizing the angle alpha of face 54, for example, the efficiency of power delivery can be maximized.

Flat faces 54 and 55 of lens 50 are easy to form and/or machine, and require considerably less expense, time and manufacturing cost to implement than spherically-shaped lenses of the type shown in FIG. 1. Dies used to encapsulate epoxy to form lens 50 need not be spherically shaped, and simple shaping and forming techniques such as grinding may be employed to form flat faces 54 and 55. Some of the advantages of flat faces 54 and 55 include increased ease of manufacturing by reducing tool or mold costs with respect to more complicated lens surfaces such as spherical or aspherical lens surfaces, enhancing power delivery efficiency, and increased flexibility for light emitter and light detector chip positioning in package 10. For example, in certain package designs it may be desirable to move light source 42/44 away from or closer to light detector 46148, all while not changing power delivery efficiency appreciably, which can be accomplished by merely changing the tilting angle alpha of flat face 54. Nevertheless, note that the power delivery efficiency of some embodiments of flat-faced optical encoder systems may be less than that provided by more expensive encoders containing spherical or aspheric lenses 50.

Figure 6:
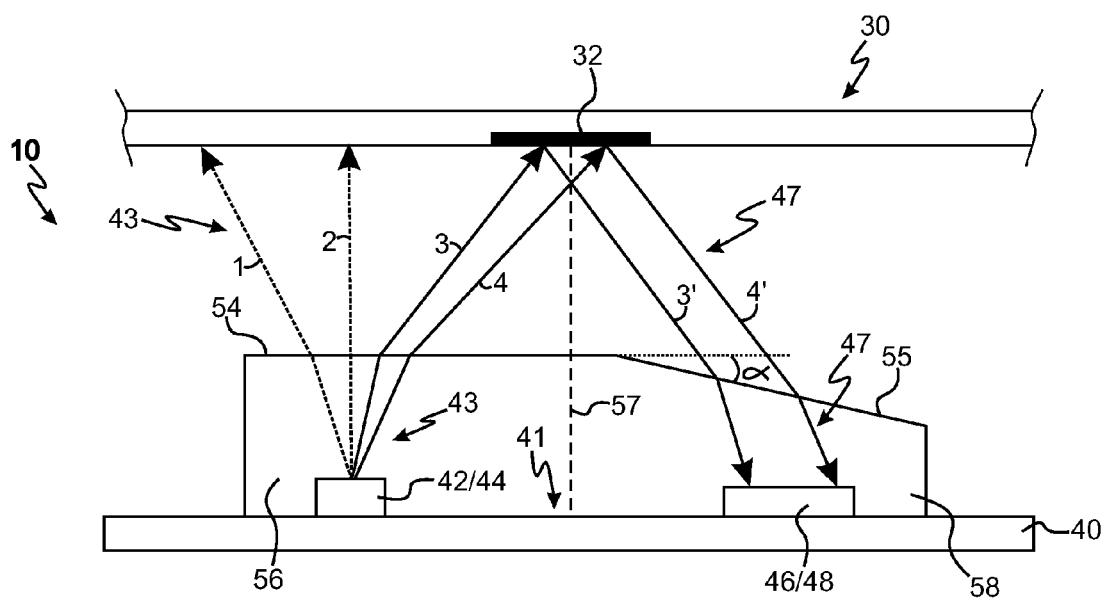
FIG. 6 shows a cross-sectional view of another embodiment of a multi-faceted flat-faced optical encoder.

FIG. 6 shows another embodiment of optical encoder 10 comprising lens 50 having flat faces 54 and 55. In the embodiment of optical encoder 10 illustrated in FIG. 6, the positions of flat faces 54 and 55 are reversed with respect to the embodiment shown in FIG. 5. That is, in FIG. 6 face 55 is now tilted with respect to the horizontal, while face 54 is aligned in the horizontal direction. Note that the embodiment shown in FIG. 6 can be expected to provide reduced power delivery efficiency with respect to the embodiment shown in FIG. 5 owing to tilted flat face 55 being disposed over light detector 46/48.

Some of the problems and disadvantages discussed above with respect to the embodiments of optical encoder 10 shown in FIGS. 5 and 6 can be overcome by employing diffractive optical elements (DOEs), which can be used to provide light-collimating, light-directing and/or light-focusing functionality similar to that which might otherwise be provided by a spherical or aspherical lens surfaces. DOEs can be employed to change, adjust or optimize the direction in which a light beam is travelling, and can augment the light-collimating, light-directing or light-focusing functionality provided by tilted flat face 54 or 55, or by the collars, lenses or shaped apertures 77 used in conjunction with light emitter 42/44 discussed above. DOEs can be employed in an optical encoder package to enhance power delivery and increase encoder performance. DOEs are typically thin phase elements that operate by means of interference and diffraction to produce desired distributions of light or to aid in the design of optical systems. Examples of DOEs include diffractive lenses, beam splitters (or spot arrays), diffractive diffusers and corrector plates.

Figure 7:
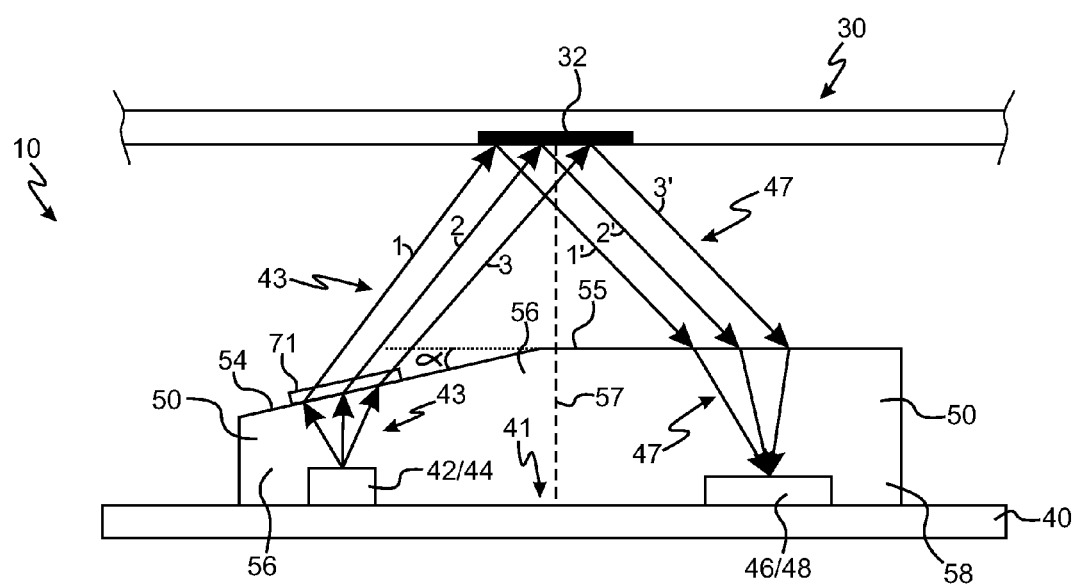
FIG. 7 shows a cross-sectional view of one embodiment of a multi-faceted flat-faced optical encoder having a diffractive optical element incorporated therein.
Figure 8:
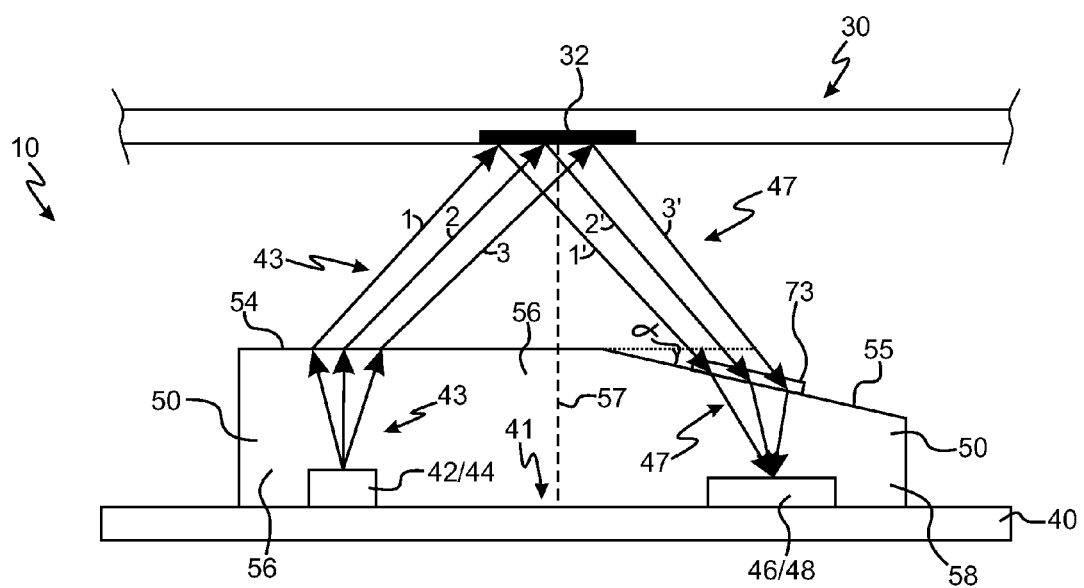
FIG. 8 shows a cross-sectional view of another embodiment of a multi-faceted flat-faced optical encoder having a diffractive optical element incorporated therein.

FIGS. 7 and 8 show embodiments of optical encoder 10 having DOEs 71 and 73 incorporated into or onto flat faces 54 and 55. In FIG. 7, DOE 71 is employed to further enhance the power delivery efficiency of the emitter beam. DOE 73 of FIG. 8 can be located above detector 46/48 to further enhance power delivery efficiency by further focusing reflected beam 47 onto detector 46148. As a result, the size of detector 46/48 and encoder 10 can be reduced, leading to lower cost. Note that according to various embodiments DOEs 71 and 73 may be employed over either one or both of light emitter 42/44 and light detector 46/48.

Figure 9:
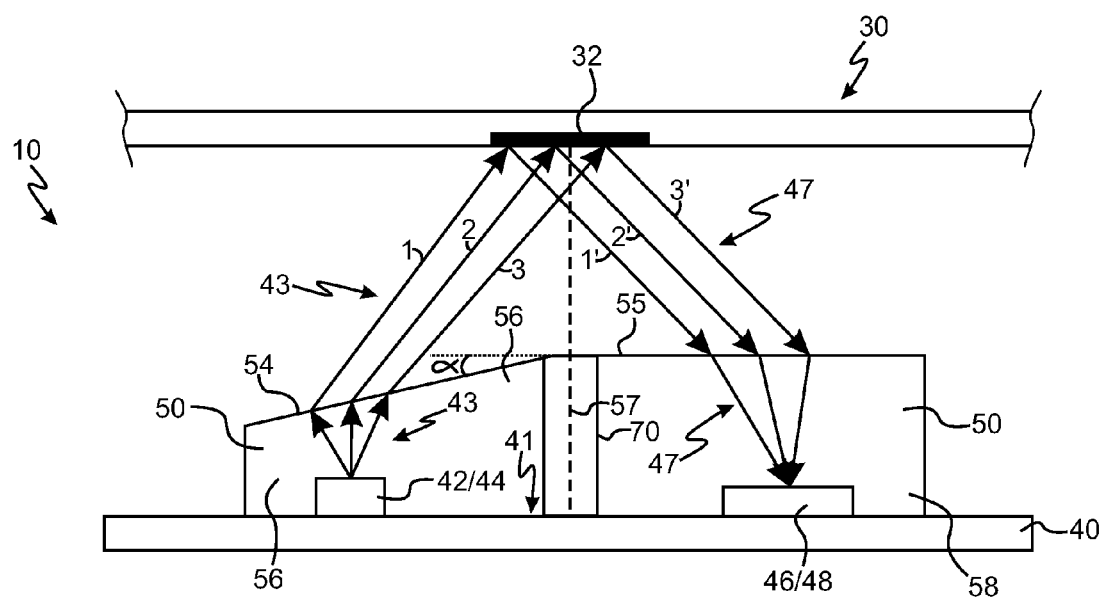
FIG. 9 shows a cross-sectional view of one embodiment of a multi-faceted flat-faced optical encoder having a light barrier incorporated therein.
Figure 10:
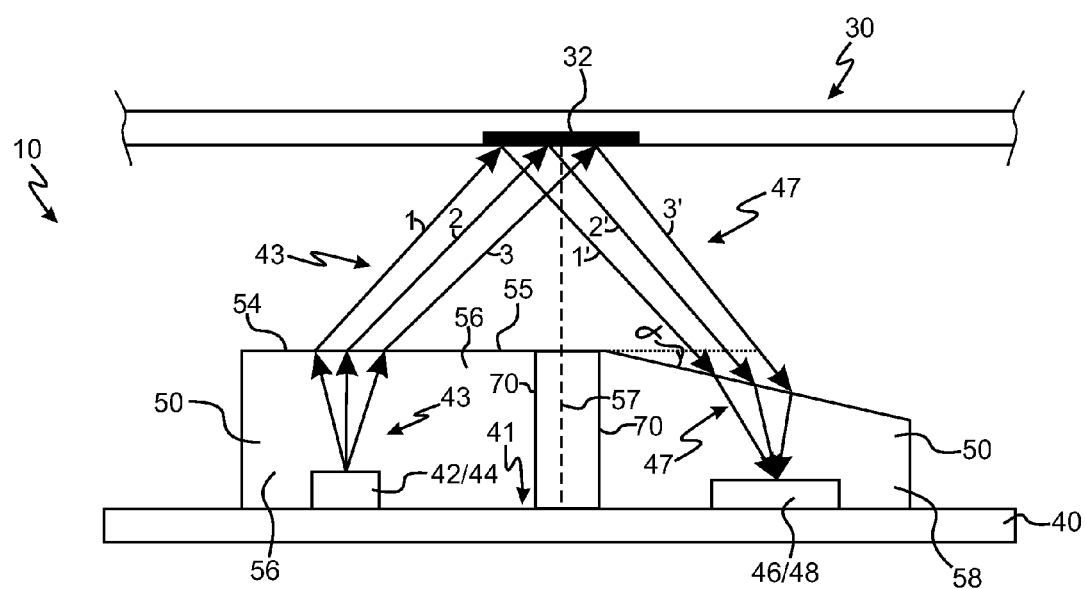
FIG. 10 shows a cross-sectional view of another embodiment of a multi-faceted flat-faced optical encoder having a light barrier incorporated therein.

Referring now to FIGS. 9 and 10, there are shown embodiments of optical encoder 10 having light baffle or barrier 70 disposed between light emitter 42/44 and light detector 46/48. Light baffle or barrier 70 prevents or reduces stray light originating at emitter 42/44 from crossing over directly to detector 46/48 within lens 50. By way of example, stray or undesired light rays can include light rays internally reflected within lens 50, light rays scattered or diffused within lens 50, out-of-line light rays reflected from or scattered or diffused by code scale 32 or any other portion of optical encoder 10 or another device or component. Light barrier 70 is configured to prevent or inhibit stray light rays from impinging upon the single track light detector 46/48. The embodiments shown in FIGS. 9 and 10 permit the performance of optical encoder 10 to be improved in respect of prior art devices. Normally the performance of an optical encoder is affected by stray light originating from the light emitter 42/44 that propagates directly to the detector 46/48, or is reflected internally, scattered or diffused within lens 50 or by another device or component, that subsequently impinges upon the detector. Light barrier 70 prevents undesired cross-talk between the light emitter 42/44 and the light detector 46/48 from occurring. A principal source of such cross-talk is light reflecting off an internal surface defined by upper surfaces of lens 50 back onto detector 46/48. Stray light reduces the image contrast of the encoder, and limits the speed or frequency that can be attained. High performance optical encoders are able to achieve high levels of image contrast and resolution. By incorporating light barrier 70 into optical encoder 10, a higher performance optical encoder can be provided. The light barrier 70 blocks to a significant degree undesired stray light from impinging upon the light detector 46/48. As a result, the noise level of optical encoder 10 is minimized.

In one method, the light barrier 70 is formed by transfer molding or insert molding. In transfer molding, the light barrier 70 is transfer molded onto substrate 40, which may be a printed circuit board, a lead frame, or the like. The light barrier 70 is preferably formed from an optically opaque, optically absorptive, optically diffusive or optically scattering material so as to block or redirect unwanted light. After transfer molding the light barrier 70 to substrate 40, die attachment and wire bonding steps are undertaken. Finally, the assembled substrate 40 having the light barrier 70 and dices 42 and 46 attached thereto and disposed thereon is placed in a mold tool and single dome lens 50 is formed thereover, preferably also using a transfer molding process.

In another method, light barrier 70 is formed by insert molding same using a high temperature plastic, and the light barrier 70 is manually placed onto the substrate 40. In a variation on such a method of transfer molding the light barrier 70, multiple cavity plastic molded light barriers are manually placed in the transfer mold tool or directly upon substrates 40 according to the particular mold tool and substrate design being employed before transfer molding single dome lenses 50. To provide increased accuracy and control, the light barrier 70 can be directly insert molded onto the substrate 40. Before transfer molding steps are undertaken, however, the dice 42 and 46 are attached to the substrate 40 and wire bonding is carried out. Then, the light barrier 70 is attached to the substrate 40 or inserted into the mold tool, depending on the particular molding tool and process design that is being employed. Transfer molding is next preferably employed to form the single dome lens 50 and encapsulate the dices 42 and 46 and the light barrier 70.

Figure 11:
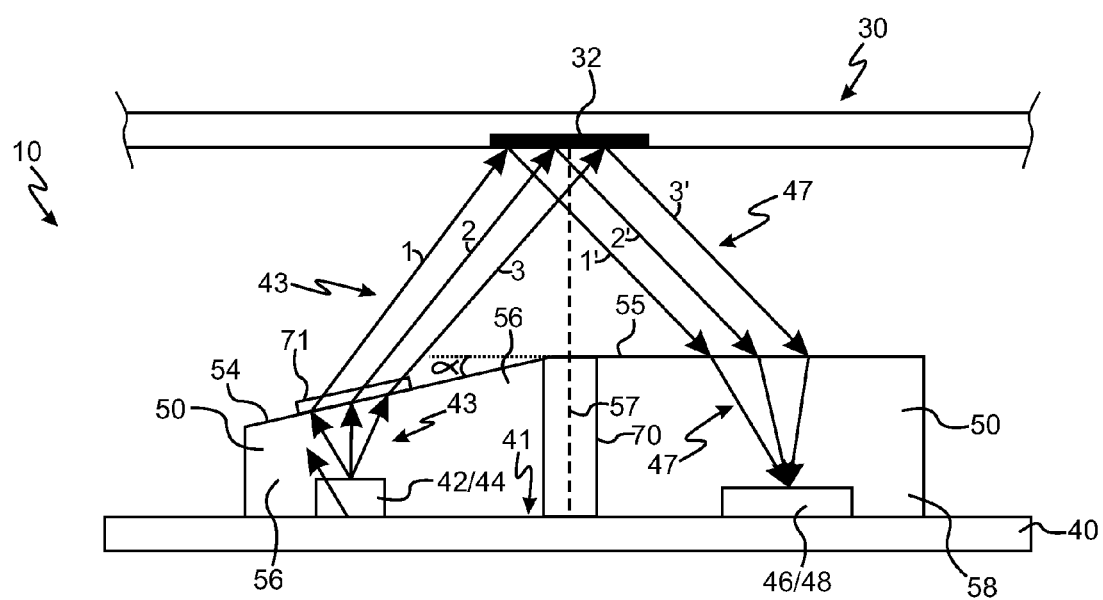
FIG. 11 shows a cross-sectional view of one embodiment of a multi-faceted flat-faced optical encoder having a diffractive optical element and a light barrier incorporated therein.
Figure 12:
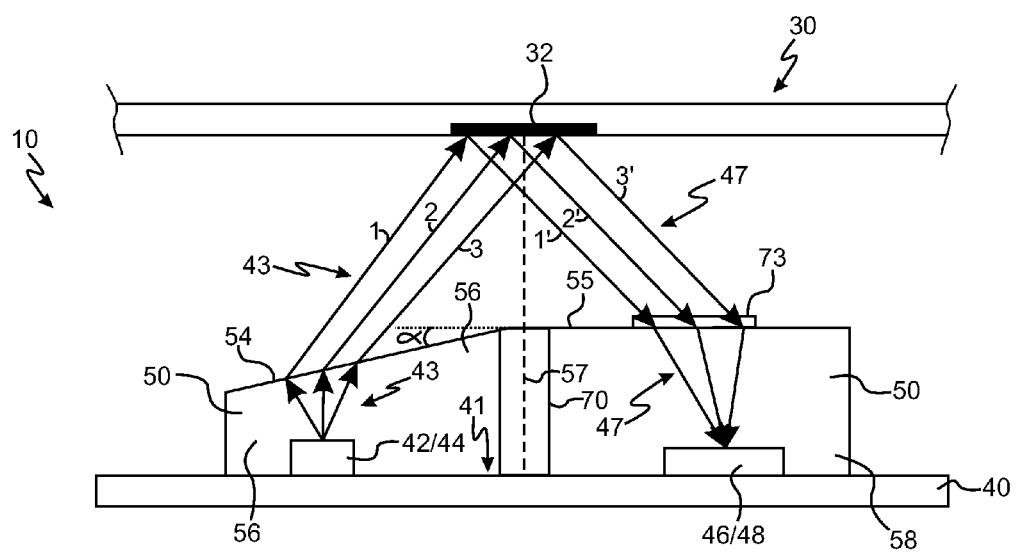
FIG. 12 shows a cross-sectional view of another embodiment of a multi-faceted flat-faced optical encoder having a diffractive optical element and a light barrier incorporated therein.
Figure 13:
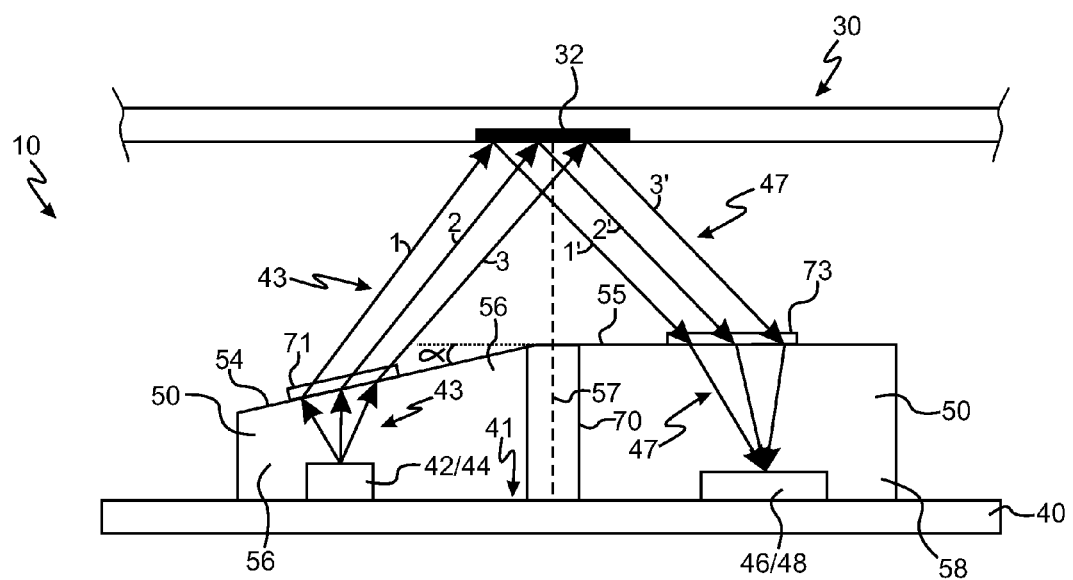
FIG. 13 shows a cross-sectional view of one embodiment of a multi-faceted flat-faced optical encoder having two diffractive optical elements and a light barrier incorporated therein.

FIGS. 11 through 13 illustrate various embodiments of optical encoders having various combinations of features such as light barrier 70, DOEs 71 and 73, face 54 tilted with respect to the horizontal, face 55 tilted with respect to the horizontal, and DOEs positioned above either or both of light emitter 42/44 and light detector 46/48.

Figure 14:
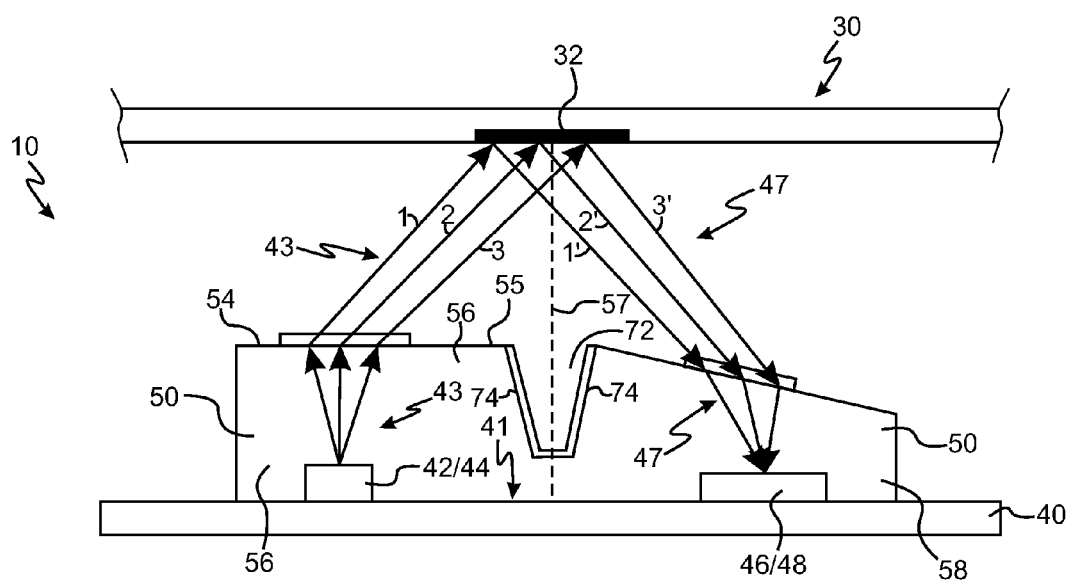
FIG. 14 shows a cross-sectional view of one embodiment of a multi-faceted flat-faced optical encoder having diffractive optical elements and an air gap trench incorporated therein.

In another embodiment, and as illustrated in FIG. 14, the functionality provided by light barrier 70 of FIGS. 11, 12 and 13 may be replaced by air gap trench 72, which is cut or formed in lens between light emitter 42/44 and light detector 46/48, and which may be further supplemented by portion 74 of lens 50 shown in FIG. 14 formed, for example, by means of laser ablation, mechanical abrasion, or by disposing an appropriate optically absorptive or diffusive coating or material on the outer surface of lens 50 in the region of trench 72. Air gap trench 72 is configured to prevent or inhibit direct light rays emitted by the light emitter 42/44 from impinging directly upon the single track light detector 46/48. Air gap trench 72 may be formed by molding, grinding, ablation, and other methods known to those skilled in the art. Other means may be employed to form an optically diffusive or absorptive portion over a portion 74 of lens 50 so as to shield the light detector 46/48 from scattered, out-of-line or otherwise undesired light rays are also contemplated and may be employed, as discussed above.

The optical encoders 10 described above may be adapted for use in incremental optical encoders having two, three or more data channels, commutation optical encoders having six or some other number of channels, pseudo absolute optical encoders, and absolute optical encoders. In addition, the optical encoders described above are particularly well adapted for miniaturization, as the light emitter 42/44 and the single-track light detector 46/48 can be placed in close proximity to one another while still permitting stray light to be minimized or substantially eliminated. The embodiments described above also permit small optical encoder packages 10 to be constructed which share the same lens 50 for transmitting and receiving light. Improved performance also results, as the noise level of the encoder 10 caused by stray light impinging upon the detector may be minimized or eliminated. Hence, the encoder 10 can be used in high speed rotary or linear systems. Moreover, minimal investments in manufacturing processes and equipment are required to implement low cost transfer molding processes, which are commonly employed in many semiconductor package encapsulation applications.

Included within the scope of the present invention are methods of making and having made the various components, devices and systems described herein.

The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

We claim:

1. A reflective optical encoder, comprising:
   a substrate having a top surface with opposing first and second sides;
   a light emitter coupled to the first side;
   a light detector coupled to the second side;
   a multi-faceted lens comprising first and second top flat faces, the first top flat face being located over the light emitter and being tilted with respect to the top surface, and the second top flat face being formed over the light detector and being parallel to the top surface; and
   a plurality of diffractive optical elements comprising first and second members and each of the first and second members comprising a major surface;
   wherein the first member of the plurality of diffractive optical elements is disposed on the first top flat face of the multi-faceted lens and the second member of the plurality of diffractive optical elements is disposed on the second top flat face of the multi-faceted lens;
   wherein the major surface of the first member of the plurality of diffractive optical elements is not parallel and tilted with respect to the major surface of the second member of the plurality of diffractive optical elements and to the top surface of the substrate;
   wherein the multi-faceted lens is configured to direct light towards a code scale for reflection therefrom, the code scale being located operably in respect of the lens such that at least a portion of the light reflected from the code scale is directed towards the second face for detection by the light detector;
   wherein the first member of the plurality of diffractive optical elements is configured to provide light-collimating functionality for light emitted by the light emitter.

2. The reflective optical encoder of claim 1, wherein the diffractive optical element comprises a beam splitter.

3. The reflective optical encoder of claim 1, wherein the diffractive optical element comprises a diffractive lens.

4. A reflective optical encoder, comprising:
   a top surface with opposing first and second sides, the top surface being substantially parallel to a horizontal plane;
   a code scale disposed adjacent to the top surface;
   a light emitter disposed on the first side of the top surface, and configured to emit light therefrom, the light emitter being configured to emit a substantial amount of light along a direction normal to the horizontal plane towards the code scale;

a light detector disposed on the second side of the top surface;

a multi-faceted lens being integrally formed over the light emitter and the light detector such that no air gap is located between the light emitter and the lens, wherein the multi-faceted lens comprises a first face directly located over the light emitter, and a second face directly located over the light detector, and wherein the first and second faces are interconnected on one side and at least one of the first and second faces is tilted with respect to the horizontal plane, the multi-faceted lens including: and a plurality of diffractive optical elements comprising first and second members and each of the first and second members comprising a major surface, wherein the first member of the plurality of diffractive optical elements is disposed on the first face, wherein the second member of the plurality of diffractive optical elements is disposed on the second face, wherein a major surface of the first member of the plurality of diffractive optical elements is not parallel and tilted with respect to the horizontal plane, and wherein the first member of the plurality of diffractive optical elements provides light-collimating functionality for light emitted by the light emitter, and wherein the code scale is located operably in respect of the multi-faceted lens such that at least a portion of the light reflected from the code scale is directed towards the second face and refracted through portions of the multi-faceted lens for detection by the light detector.

5. The reflective optical encoder of claim 4, wherein the first face is substantially parallel to the horizontal plane and the second face is tilted with respect to the horizontal plane.

6. The reflective optical encoder of claim 4, wherein the second face is substantially parallel to the horizontal plane and the first face is tilted with respect to the horizontal plane.

7. The reflective optical encoder of claim 4, wherein the at least one of the first and second faces is tilted with respect to the horizontal plane at an angle that is selected such that efficiency of power delivery is maximized.

8. The reflective optical encoder of claim 4, further comprising a light barrier disposed between the light emitter and the light detector, the light barrier being configured to prevent or inhibit stray light rays emitted by the light emitter from impinging upon the light detector.

9. The reflective optical encoder of claim 4, wherein at least a portion of the first face or the second face is treated to prevent stray light rays from impinging upon the light detector.

10. The reflective optical encoder of claim 4, wherein the lens comprises substantially flat surfaces including the first face and the second face, and is not spherically shaped lens surfaces.

11. The reflective optical encoder of claim 4, wherein the plurality of diffractive optical elements changes directions of light rays transmitted to and from the code scale.

12. The reflective optical encoder of claim 11, wherein the plurality of diffractive optical elements are configured to augment light directing functionality provided by the tilting of the at least one of the first face and the second face.

13. The reflective optical encoder of claim 11, wherein the plurality of diffractive optical elements comprises thin phase elements that operate by at least one of interferences and diffraction.

14. The reflective optical encoder of claim 11, wherein the plurality of optical elements comprises at least one of a diffractive lens, a beam splitter, a spot array, a diffractive diffuser, and a corrector plate.

15. The reflective optical encoder of claim 11, wherein the code scale comprises data strips disposed between the light emitter and the light detector, wherein the data strips intersect a normal axis perpendicular to the horizontal plane, and the first member of the plurality of diffractive optical elements is disposed on the first face approximating the light emitter but distanced away from the normal axis.

16. The reflective optical encoder of claim 11, wherein the code scale comprises data strips disposed between the light emitter and the light detector, wherein the data strips intersect a normal axis perpendicular to the horizontal plane, and the second member of the plurality of diffractive optical elements is disposed on the second face approximating the light detector but distanced away from the normal axis.

17. An encoder system, comprising:
an emitter configured to emit light;
a receiver configured to receive reflected light that is emitted from the emitter;
a substrate having a first surface extending along a first plane, wherein the emitter and the receiver are disposed on the first surface;
a code scale configured to receive the light from the emitter, wherein the code scale is configured to reflect a portion of the light back towards the receiver, the code scale intersecting a normal axis that is between the emitter and the receiver, the normal axis being substantially perpendicular to the first plane so as to divide the substrate to a first side having the emitter and a second side having the receiver;
a multi-faceted lens having a first face, a second face and a body, wherein the body is configured to cover the first surface of the substrate, the emitter, and the receiver, wherein the first face is located over the emitter on the first side such that the first face intercepts the light emitted from the emitter, wherein the second face is located over the receiver on the second side such that the second face intercepts the light reflected from the code scale; and
a first diffractive optical element disposed on the first face;
a second diffractive optical element disposed on the second face, wherein the first diffractive optical element comprises a major surface that is not parallel and is tilted with respect to a major surface of the second diffractive optical element, and wherein the first diffractive optical element provides light-collimating functionality for light emitted by the emitter.

18. The encoder system of claim 17, wherein the first diffractive optical element comprises a beam splitter.

19. The encoder system of claim 18, wherein the first diffractive optical element comprises a diffractive lens.

20. The encoder system of claim 19, wherein the major surface of the first diffractive optical element is also not parallel and is tilted with respect to the first surface of the substrate.

* * * * *